US005527421A

United States Patent [19]

Uehara et al.

[11] Patent Number: 5,527,421

[45] Date of Patent: Jun. 18, 1996

[54] SHEET STICKER

[75] Inventors: Tsukasa Uehara, Kawasaki; Masami Kojima, Tokyo, both of Japan

[73] Assignee: Canon Kabushiki Kaisha, Tokyo, Japan

[21] Appl. No.: 287,413

[22] Filed: Aug. 9, 1994

Related U.S. Application Data

[63] Continuation of Ser. No. 812,065, Dec. 18, 1991, abandoned.

[30] Foreign Application Priority Data

| | | | |
|---|---|---|---|
| Dec. 20, 1990 | [JP] | Japan | 2-413443 |
| Dec. 20, 1990 | [JP] | Japan | 2-413444 |
| Dec. 20, 1990 | [JP] | Japan | 2-413445 |

[51] Int. Cl.[6] ..... B32B 31/00

[52] U.S. Cl. ..... 156/539; 156/285; 156/299; 156/556; 156/583.8; 269/58; 100/233

[58] Field of Search ..... 156/539, 556, 156/580, 581, 583.1, 583.8, 583.9, 285, 299; 100/233; 269/29, 58, 21

[56] References Cited

U.S. PATENT DOCUMENTS

| | | | |
|---|---|---|---|
| 1,960,475 | 5/1934 | Canfield | 154/41 |
| 2,337,250 | 12/1943 | Klassen | 156/583.8 |
| 3,738,890 | 6/1973 | Johnson et al. | 156/286 |
| 4,156,399 | 5/1979 | Fieux | 156/494 X |
| 4,220,491 | 9/1980 | Metcalf et al. | 156/285 |
| 4,792,373 | 12/1988 | Hsei et al. | 156/581 X |
| 4,875,966 | 10/1989 | Perko | 156/580 |
| 5,098,508 | 3/1992 | Mattil | 156/363 |

FOREIGN PATENT DOCUMENTS

| | | |
|---|---|---|
| 34441 | 7/1885 | Germany . |

*Primary Examiner*—David A. Simmons
*Assistant Examiner*—J. Sells
*Attorney, Agent, or Firm*—Fitzpatrick, Cella, Harper & Scinto

[57] ABSTRACT

A sheet sticker apparatus includes a pair of bases for supporting sheets, at least one of which has an adhesive thereon. One of the bases can be overlaid on the other. The apparatus also includes a positioning device for correctly positioning the sheets on the respective bases; an attraction device for at least one of the bases for attracting the sheet positioned by the positioning device; and an aligning device for aligning the bases relative to each other when the bases are overlaid with each other.

19 Claims, 11 Drawing Sheets

SHEET STICKER

This application is a continuation of application Ser. No. 07/812,065, filed Dec. 18, 1991, now abandoned.

FIELD OF THE INVENTION AND RELATED ART

The present invention relates to a sheet sticker for sticking or mounting a sheet on another sheet or board with precise alignment therebetween.

When, for example, a photograph or a color copy is mounted on a mount such as a relatively thick board, having the same size for the purpose of preparing an album or post cord, they are manually aligned and stuck with each other.

However, this manual operation results in misalignment therebetween, and if great care is paid to the alignment, the operation is time consuming, and therefore, inefficient.

SUMMARY OF THE INVENTION

Accordingly, it is a principal object of the present invention to provide a sheet sticker capable of sticking two sheets with correct alignment.

According to the present invention, there is provided a sheet sticker apparatus, comprising: a pair of bases for supporting sheets, at least one of which has an adhesive thereon, where one of said bases can be overlaid on the other; positioning means for correctly positioning the sheets on the respective bases; attraction means for at least one of said bases for attracting the sheet positioned by said positioning means; and aligning means for aligning the bases relative to each other when said bases are overlaid with each other.

Adhesive may be one workable in the normal temperature or the one usable with heat. When use is made with a heat fusible adhesive, the sheet support of the base may be provided with heating means to heat the sheets the sheets are overlaid with each other.

In order to correctly overlay the bases, the bases may be joined by a hinge, or one of the bases may be provided with positioning cone pins, and the other of the bases may be provided with holes in alignment with the pins, in which case one of the bases is overlaid on the other base, keeping them parallel. The means for correctly positioning the sheet on the base may be the one projectable beyond the sheet supporting surface. When the bases are separate from each other, the means are projected beyond the supporting surface to effect the positioning function. When the bases are overlaid with each other, the positioning means may be retracted below the supporting surface. By doing so, the bases may be overlaid with each other without interference by the sheet positioning means.

As for the means for attracting the sheet on the base, it may be of an electrostatic attraction type, or in the form of a vacuum type.

According to the present invention, the sheets are correctly positioned on the respective bases, and the attracting means functions to maintain the correct position, and thereafter, the positioning means is effective to correctly position the bases, so that the sheets can be stuck with each other with positional precision.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
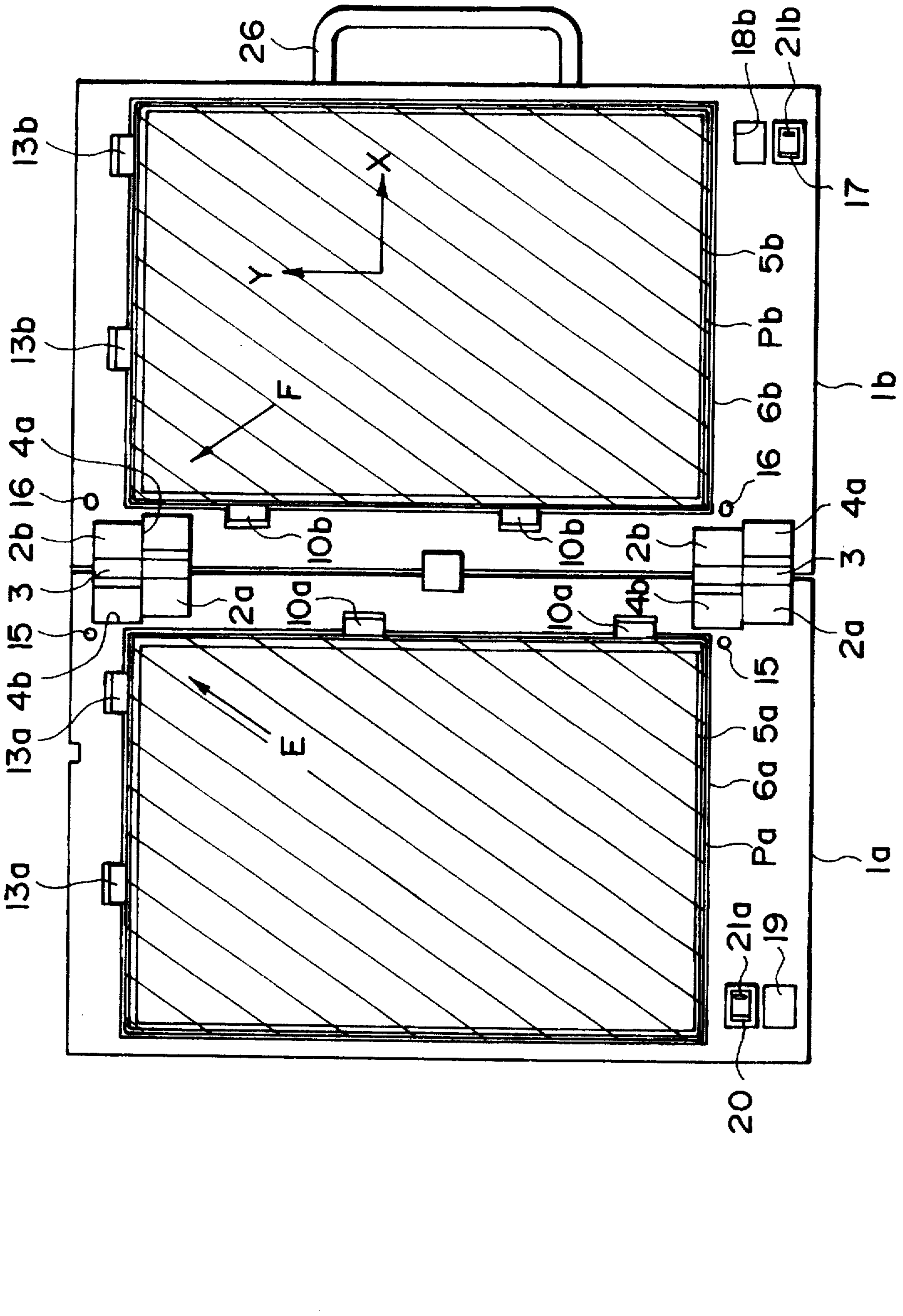
FIG. 1 is a top plan view of a sheet sticker according to a first embodiment of the present invention.
Figure 2:
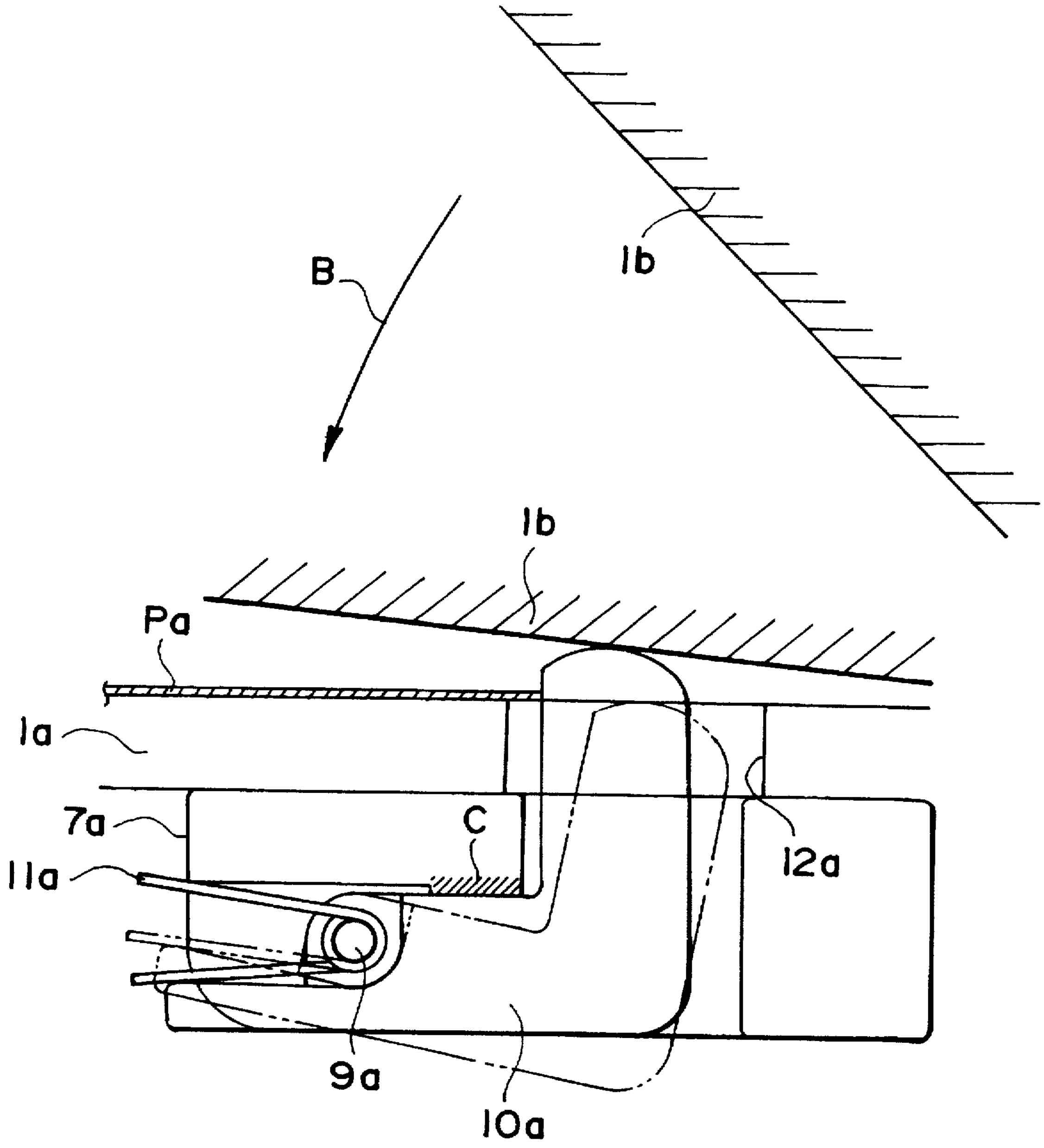
FIG. 2 is a side view illustrating an operation of an aligner of the apparatus of FIG. 1.
Figure 3:
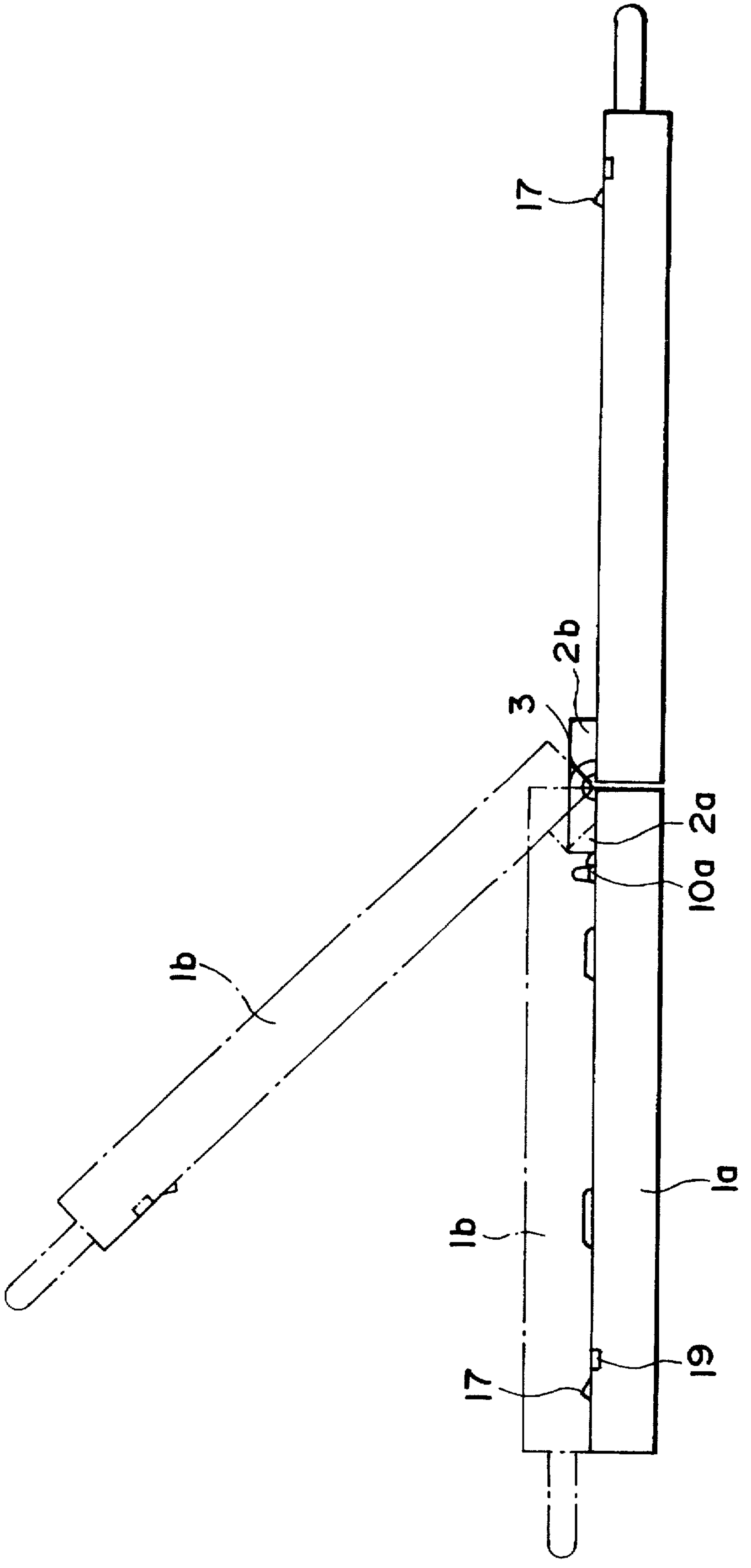
FIG. 3 is a side view illustrating opening and closing of the apparatus of FIG. 1.

Referring to FIGS. 1–3, a sheet sticker apparatus according to a first embodiment of the present invention will be described.

Base members or bases 1*a* and 1*b* have substantially the same sizes. The bases 1*a* and 1*b* are provided with bearings 2*a* and 2*b* at sides adjacent to each other. A shaft or pin 3 penetrates through the bearings 2*a* and 2*b* to permit hinge action between the bases 1*a* and 1*b* about the shaft 3. When the bases are closed, the bearings 2*a* and 2*b* enter recesses 4*a* and 4*b* so as to avoid interference of the bearings 2*a* and 2*b* with the other bases 1*b* and 1*a*.

Electrostatic attraction plates 5*a* and 5*b* are mounted on the bases 1*a* and 1*b*. On the electrostatic attraction plates 5*a* and 5*b*, sheets Pa and Pb, which are applied with adhesive at one side are placed. The bases are provided with grooves 6*a* and 6*b* having a predetermined width having centers substantially in alignment with the edges of the sheets Pa and Pb. The grooves are effective to prevent the adhesive from sticking to the top surface of the bases 1*a* and 1*b* when the adhesive drops beyond the edges.

The adhesive may be applied to only one of the sheets Pa and Pb.

An aligner 10*a* in the form of a hook is rotatably supported on a pin 9*a* which is supported on a bracket 7*a* on the bottom surface of the base 1*a*. When the horizontal portion of the aligner 10*a* abuts a surface C of the bracket 7*a*, it is effective to confine the sheet Pa in the direction X (FIG. 1). The aligner 10*a* is urged in the counterclockwise direction by a twisting spring 11*a*. The base 1*a* is provided with a hole 12*a* for permitting retraction of the aligner 10*a*.

An aligner 10*b* having the similar structure as the aligner 10*a* is provided on the base 1*b*. An aligner 13*a* for confining the sheet in the direction Y is provided on the base 1*a*, and a similar aligner 13b is provided on the base 1b. Among these aligners, the aligners 10a and 10b for confinement in the X direction are disposed at such positions as will not interfere with each other when the bases are closed and are close to the pin 3.

Adjacent upper and bottom portions at the right side of the base 1a, projections 15 are provided, and the base 1b is provided with elongated hole 16 for receiving the projections 15 to assure the correct positional relation between the bases 1a and 1b in the Y direction.

A main switch 20 is in the form of a seesaw switch. When it is actuated, an LED 21a is lit up to permit notification of the on state to the operator. When the bases are closed, the main switch 20 is received by a recess 18b, so that the main switch is not deactuated even when the bases are closed.

A seesaw switch 17 for the electrostatic attraction plates 5a and 5b is provided. When the switch is actuated, the LED 21b is turned on to permit notification to the operator. An operating member 19 functions to deactuate the switch when the bases are closed, as shown in FIG. 3. Thus, when they are closed, the sheet attracting force disappears.

A grip 26 is provided at an outer end of the base 1b to facilitate opening and closing the base 1b.

In operation, the operator places the sheet Pa having the adhesive on its one side on the base 1a with the adhesive side facing up. The operator moves the sheet Pa in a direction indicated by an arrow E in FIG. 1 to abut the sheets to the aligners 13a and 13a for the positioning in the Y direction and abuts the sheets to the aligners 10a and 10a for the positioning in the X direction, so that the sheet Pa is correctly positioned in the X and Y directions.

Similarly, the sheet Pb is moved in a direction indicated by an arrow F, and the sheet Pb is correctly positioned with the aid of aligners 10b, 10b, 13b and 13b.

Then, the main switch 20 is actuated, and subsequently, the switch 17 for the electrostatic attraction plate is actuated, by which the sheets Pa and Pb are attracted on the bases 1a and 1b by the electrostatic attraction plates 5a and 5b. The main switch 20 may be actuated at the start of the operation.

With this state, the operator uses the grip 26 to rotate the base 1b (in FIG. 2) in the direction of the arrow B about the pin 3 until the projection 15 is received by the elongated slot 16. In this manner, the bases 1a and 1b are positioned relative to each other in the Y direction. The positions of the bases 1a and 1b in the X direction are determined by the pin 3 and the bearings 2a and 2b.

Then, the base 1b is overlaid on the base 1a, so that the sheets Pa is mounted on the sheet Pb with correct alignment.

At this time, as shown in FIG. 2, the aligners 10a, 10b, 13a and 13b are pushed by the base 1b to rotate in the clockwise direction, so that they are disengaged from the edges of the sheets Pa and Pb. The seesaw switch 17 for the electrostatic attraction plate is actuated by the pushing member 17, upon which the electrostatic attraction force by the attraction plates 5a and 5b disappears, thus facilitating taking the sheets Pa and Pb which are stuck to each other.

Figure 4:
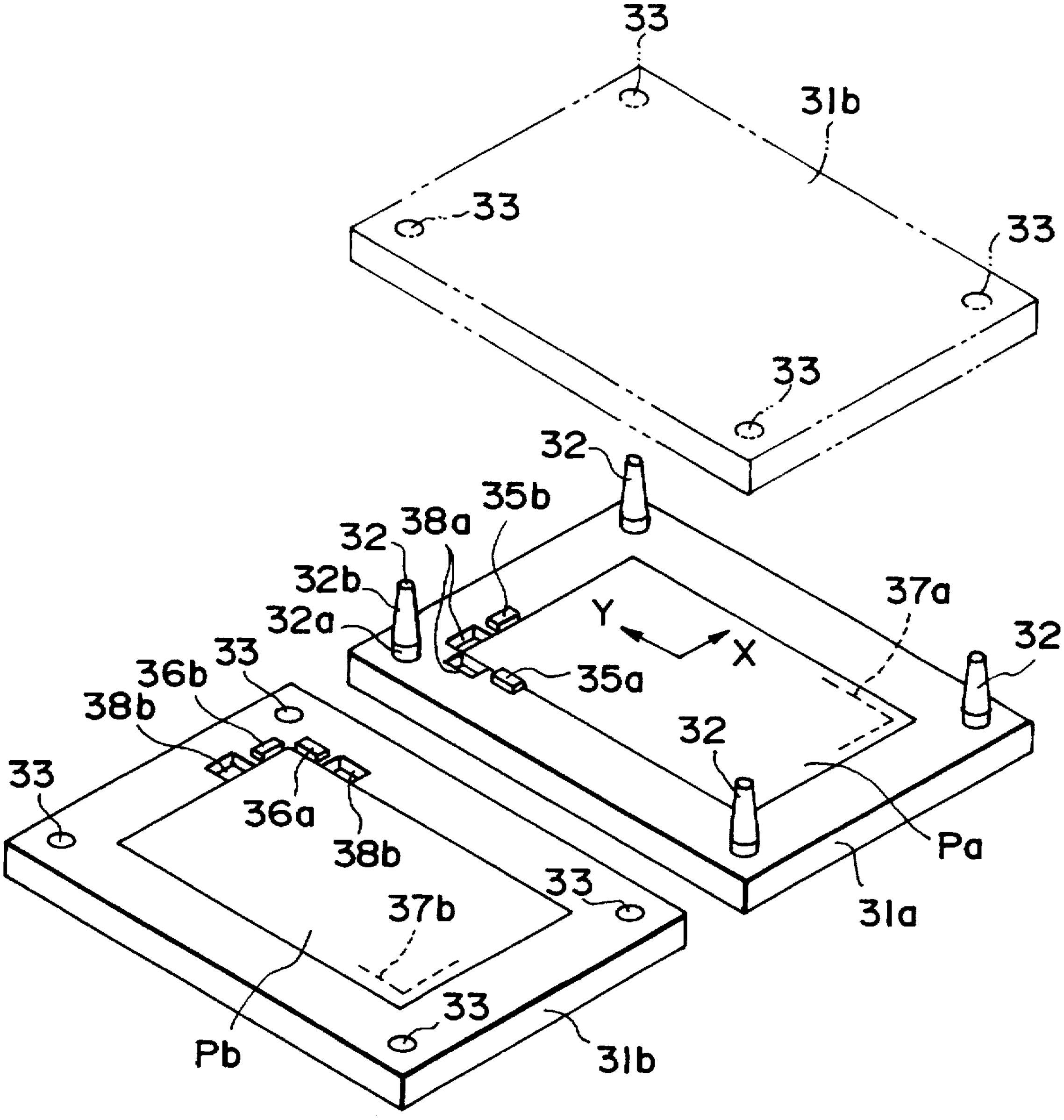
FIG. 4 is a perspective view of a sheet sticker apparatus according to a second embodiment of the present invention.

Referring to FIG. 4, a description will be provided as to a second embodiment of the present invention. Rectangular base members or bases 31a and 31b have substantially the same sizes. The base 31a is provided with pins 32 planted adjacent four corners thereof. Each of the pins 32 is generally cylindrical at its base portion 32a, and the diameter reduces toward its tip end portion 32b, and therefore, the pin as a whole is generally in the form of a cone. The base 31b is provided with positioning holes 33 adjacent the four corners thereof, for receiving the base portions 32a of the pins 32.

The bases 31a and 31b are also provided with aligners 35a, 35b and 36a, 36b for positioning the sheets Pa and Pb in the X and Y directions. The bases 31a and 31b have electrostatic attraction plates 37a and 37b for supporting the sheets Pa and Pb, respectively. Holes 38a and 38b receive the aligners 36a and 36b, and 35a and 35b.

The sheets Pa and Pb are placed on the electrostatic attraction plates 37a and 37b so as to abut the aligners 35a, 35b, 36a and 36b. Thereafter, the electrostatic attraction plates 37a and 37b are actuated.

Then, the base 31b is rotated to be upside-down and is raised to the position indicated by chain lines in FIG. 4. The positioning holes 33 are manually aligned with the positioning pins 32. Then, the base 31b is overlaid on the base 31a, and thereafter, and when they become integral, the electrostatic attraction plates 37a and 37b are deactuated. Then, the sheet Pa and Pb are stuck with each other. After the operation, the base 31a is separated from the base 31b, and the mounting sheets Pa and Pb are taken out.

As described in the foregoing, according to this embodiment of the present invention, the two bases provided with attraction and aligning mechanisms are overlaid with each other, so that the sheet may be mounted on another sheet or board with high accuracy and with high efficiency. In addition, when the apparatus is not used, the bases can be overlaid so that a large space is not required.

According to the embodiment in which the two bases are connected by a hinge, the positioning mechanism can be simplified.

The use of the electrostatic attraction force permits the apparatus to be of small size.

Since the attraction means is deactuated when the bases are overlaid, and therefore, the sheets after being mounted can be easily taken out with the advantage of requiring a smaller power consumption.

In the foregoing embodiments, the electrostatic attraction means may be replaced with vacuum type attraction means.

The sheet attraction means may be provided on only one of the two bases 1a and 1b, in which case the base having the attraction means is moved to establish the overlaid state.

Figure 5:
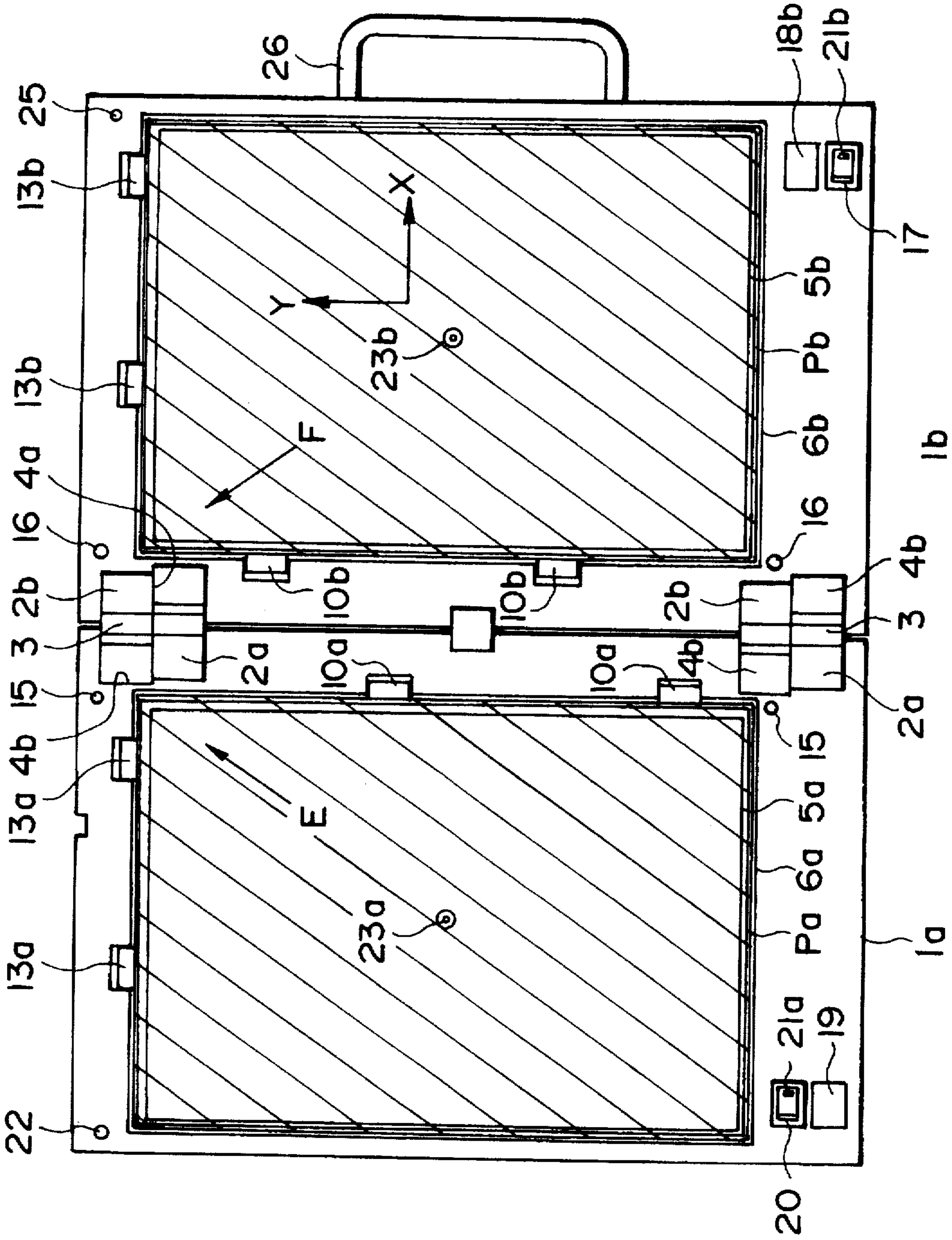
FIG. 5 is a top plan view of a sheet sticker apparatus according to a third embodiment of the present invention.

Referring to FIG. 5, a description will be provided as to a third embodiment of the present invention. In this embodiment, the two sheets are stuck to each other by a heat-fusible adhesive. Since the structure of this embodiment is similar, the same reference numerals as in the first embodiment are assigned to the elements having the corresponding functions, and the detailed description thereof are omitted for simplicity of explanation. A push switch 22 in FIG. 5 is for actuating heaters 23a and 23b. The switch 22 is pressed by a pushing rubber. The heaters 23a and 23b are mounted in holes adjacent centers of the bases 1a and 1b. The heaters 23a and 23b are energized by the switch 22 being pressed by the pushing rubber 25, when the bases 1a and 1b are closed to each other. However, if the main switch 21 is not actuated, the heaters 23a and 23b are not energized even when the bases are closed advertently.

In operation, the operator places the sheet Pa having adhesive, with the adhesive side facing up. When the sheet is placed thereon, the sheet Pa is moved in the direction E. For the purpose of positioning of the sheet Pa in the Y direction, it abuts the aligners 13a and 13a, and for the purpose of the positioning in the X direction, the sheet Pa abuts the aligners 10a and 10a.

Similarly, the sheet Pb is moved in the direction F, so that the sheet Pb is positioned correctly by the aligners 10*b*, 10*b*, 13*b* and 13*b*.

Then, the main switch 20 is actuated, and the electrostatic attraction plate switch 17 is actuated, so that the sheets Pa and Pb are attracted on the bases 1*a* and 1*b* by the electrostatic attraction plates 5*a* and 5*b*. The main switch 20 may be actuated at the start of the operation.

Then, the operator uses the grip 26 to rotate the base 1*b* about the pin 3 in the direction B in FIG. 2 until the projections 15 are engaged with the associated elongated holes 16. Thus, the bases 1*a* and 1*b* are correctly positioned relative to each other in the direction Y. The relative position between the bases 1*a* and 1*b* in the X direction is correctly determined by the pin 3 and the bearings 2*a* and 2*b*.

Then, the base 1*b* is overlaid on the base 1*a*, so that the sheets Pa and Pb are accurately overlaid. Simultaneously, the pushing rubber 25 actuates the heater switch 22, upon which the heaters 23*a* and 23*b* generate heat, so that the sheets Pa and Pb are bonded at the central spot.

At this time, as shown in FIG. 2, the aligners 10*a*, 10*b*, 13*a* and 13*b* are pushed by the base 1*b* to rotate in the clockwise direction so as to be away from the sheet Pa and Pb edges. The seesaw switch 17 for the electrostatic attraction plates are pushed by the pushing member 19 to be deactuated, and therefore, the attraction force disappears to make it easy to take the mounted sheets Pa and Pb out. When the bases 1*a* and 1*b* are opened, the push switch 22 restores is restored restoring a force of a spring or the like, so that it is deactuated to the energize the heater.

The mounted sheets Pa and Pb are taken out. After the operation is completed, the operator deactuates the main switch 21, and the bases 1*a* and 1*b* are overlaid.

Figure 6:
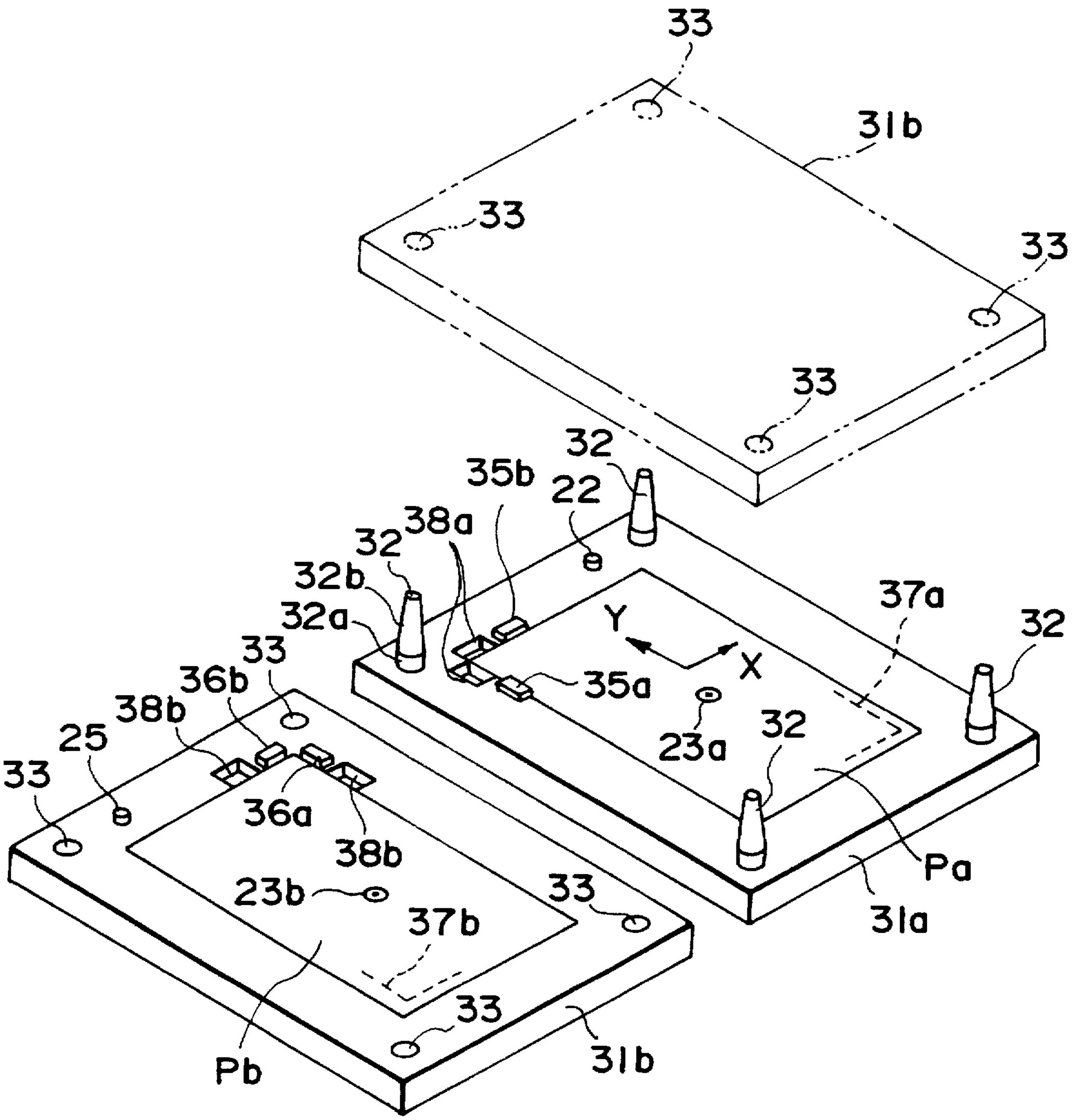
FIG. 6 is a perspective view of a sheet sticker apparatus according to a fourth embodiment of the present invention.

Referring to FIG. 6, a fourth embodiment of the present invention will be described. Since this embodiment is similar to the second embodiment described hereinbefore, the same reference numerals as in the second embodiment are assigned to the elements having the corresponding functions, and the detailed description thereof is omitted for simplicity of explanation.

In FIG. 6, heaters 23*a* and 23*b* are mounted in holes adjacent centers of bases 1*a* and 1*b*. The heaters 23*a* and 23*b* are energized in response to actuation of a push switch 22. The push switch 22 is actuated by a pushing rubber 25.

When the base 31*b* is overlaid on the base 31*a*, the pushing rubber 25 pushes the switch 22, upon which the heaters 23*a* and 23*b* are energized. When, however, the main switch (not shown) is not actuated, the heaters 23*a* and 23*b* are not energized even if the base 31*b* is overlaid on the base 31*a* advertently.

In operation, sheets Pa and Pb abut the aligners 35*a* and 35*b*, and 36*a* and 36*b*, respectively. Thereafter, the electrostatic attraction plates 37*a* and 37*b* are actuated.

Then, the base 31*b* is turned upside-down, and is raised to the position indicated by chain lines in FIG. 4. The positioning holes 33 are aligned with the positioning pins 32, and the base 31*b* is overlaid on the base 31*a*. Thereafter, the heaters 23*a* and 23*b* are energized to stick the sheets 31*a* and 31*b*. Thus, the sheets are stuck to each other in the manner described in the previous embodiment.

In this embodiment, the adhesive may be applied only one side of one of the sheets Pa and Pb. The electrostatic attraction plate may be mounted on only one of the bases.

In addition, the heater may be mounted on only one of the bases. Grooves 6*a* and 6*b* having a predetermined width may be formed on the bases at such positions that the outer edges of the sheets Pa and Pb are aligned with the center of the grooves. By doing so, the adhesive drops in the groove so that the base surface is protected from contamination with the adhesive.

As described in the foregoing, according to this embodiment, the first and second sheets are placed on the respective bases with positional precision, and the first sheet and the second sheet are stuck to each other by heating the adhesive after the first and second bases are correctly positioned relative to each other. Therefore, the two sheets may be easily and correctly stuck to each other using a simple structure and with high efficiency.

When the apparatus is not used, the bases may be overlaid with each other so as to require only a small space.

In the embodiments in which the sheets Pa and Pb are stuck by the heaters 23*a* and 23*b* only at a spot, the sheets are taken out of the apparatus, and then they are stuck on the whole surface by a separate heating and pressing apparatus.

In the third and fourth embodiments, the electrostatic attraction mechanism may be replaced with vacuum attraction mechanism. The sheet attraction means may be provided for only one of the bases 1*a* and 1*b*. In this case, the base having the attraction means is moved to be overlaid on the other base not having the attraction means. In these embodiments, the adhesive or heat fusible adhesive is applied on the sheet beforehand, but the adhesive may be applied after the sheets are placed on the bases 1*a* and 1*b*.

Figure 9:
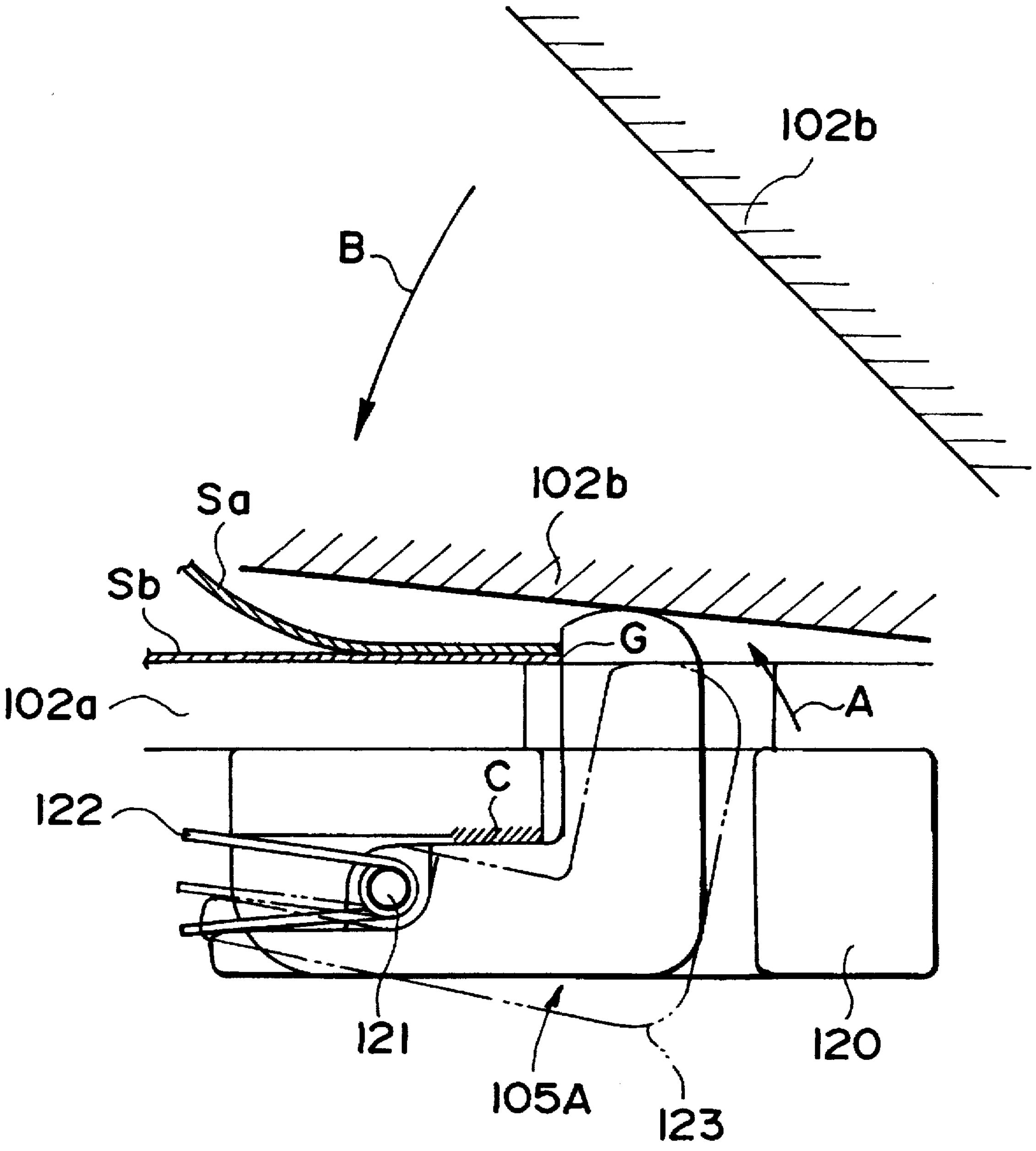
FIG. 9 is a side view illustrating an operation of an aligner of the apparatus of FIG. 7.

Referring to FIG. 9, a further embodiment of the present invention will be described, wherein the present invention is applied to a sheet folding apparatus. The apparatus of this embodiment is suitable when, for example, a sheet having images at the left and right sides is folded at the center thereof, and a plurality of such folded sheets are stacked to produce a simplified album.

Figure 7:
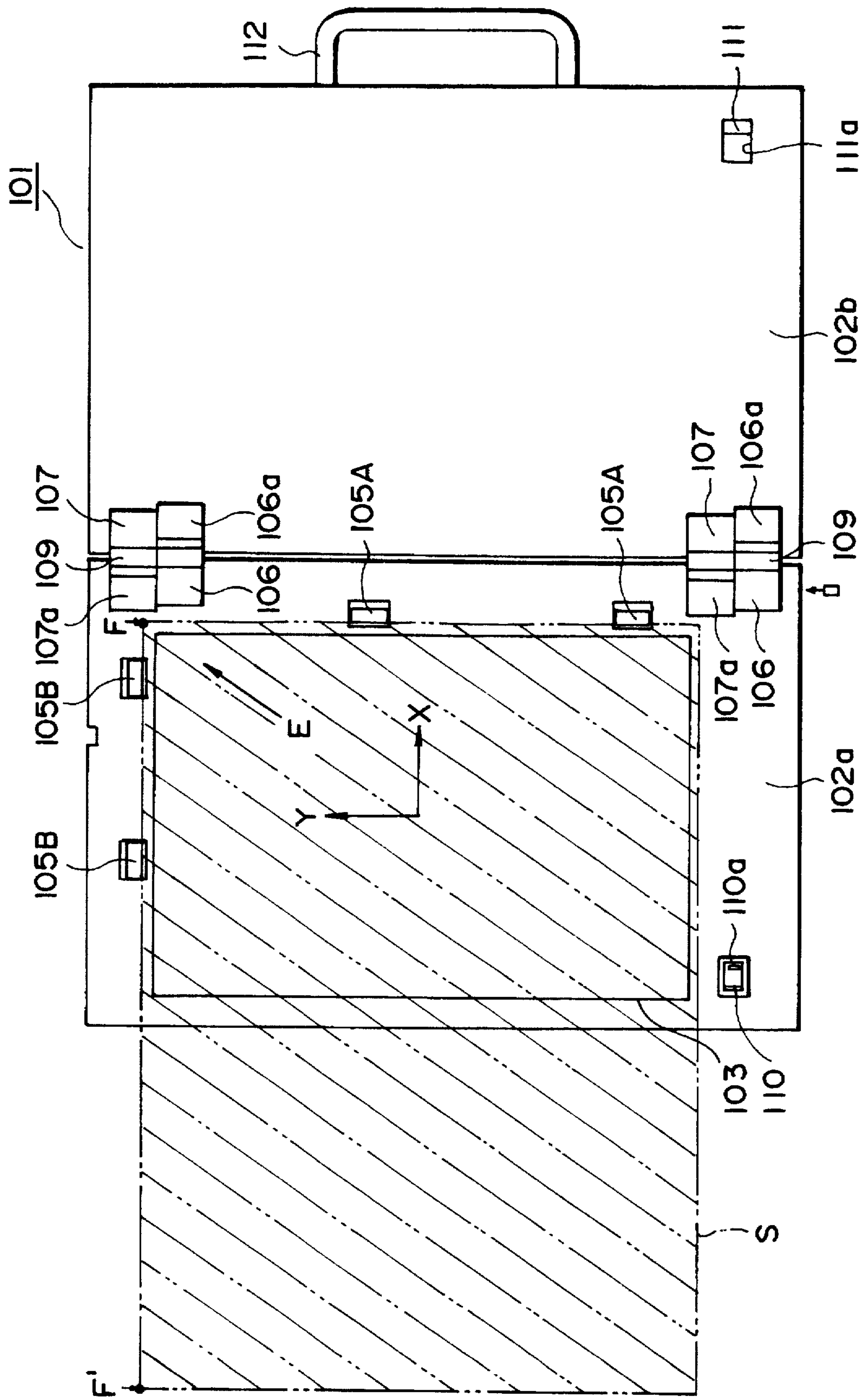
FIG. 7 is a top plan view of a sheet folder and sticker apparatus according to an embodiment of the present invention.

In FIG. 7, a sheet S is the sheet to be folded by the folding apparatus 101. The sheet S is partly placed on a first base 102*a*, and is pressed by a second base 102*b*. The first base 2 is provided with an electrostatic attraction mechanism or plate 103 for electrostatically attracting the sheet S placed on the first base 2.

The first base 102*a* is provided with plural aligner unit 105A for aligning the sheet on the top surface of the second base 102*b* and additional plural aligner units 105B. The aligner units 105A are effective to position a longitudinal edge (X direction) of the sheet S, and the other aligner units 105B are effective to correctly position the side edge (Y direction) of the sheet S.

Figure 8:
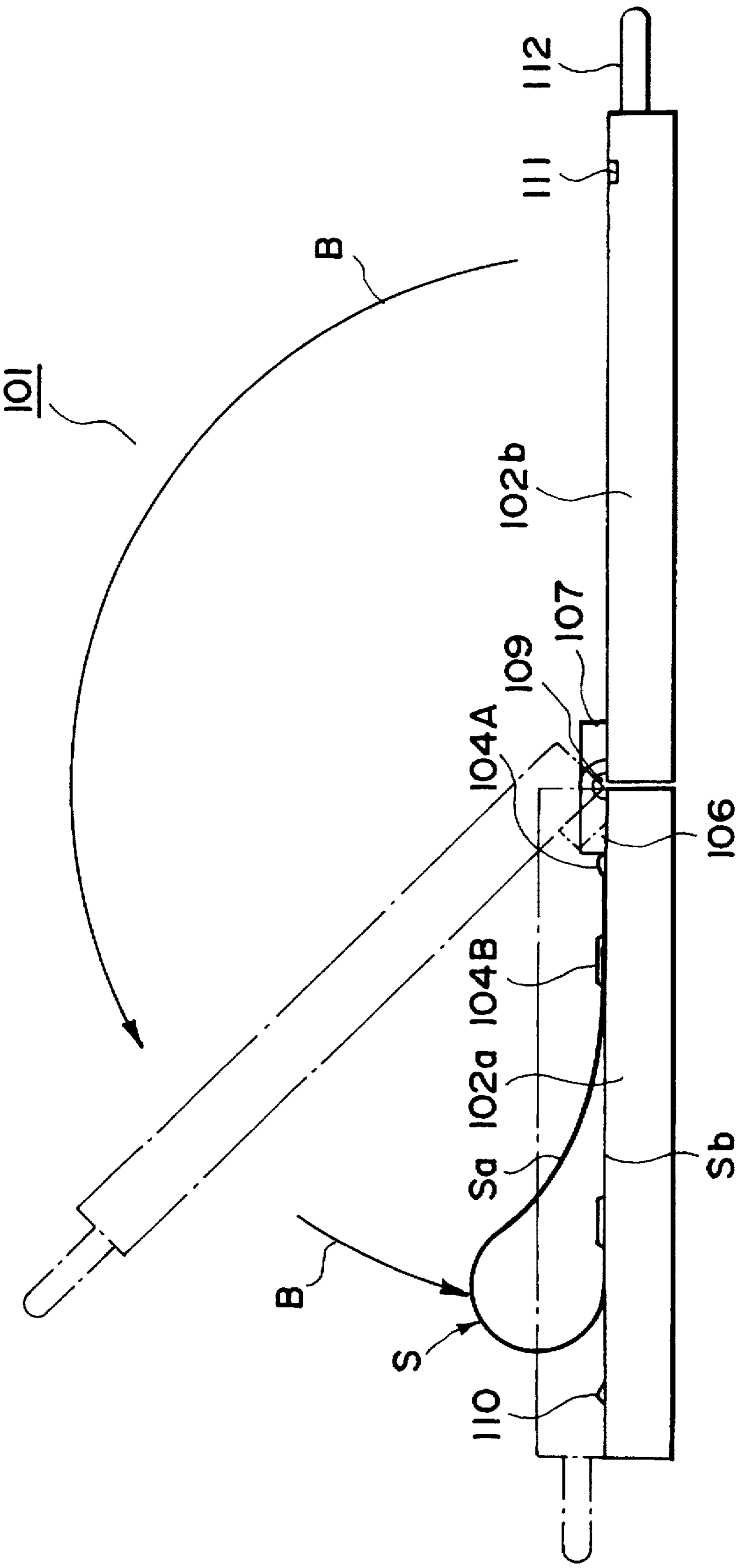
FIG. 8 is a side view illustrating opening and closing of the apparatus of FIG. 7.

The base portion of the first base 102*a* is provided with plural bearings 106 for supporting a hinge pin 109, and the base portion of the second base 102*b* is provided with plural bearings 107 for supporting the hinge pin 109. The second base 102*b* is rotatable relative to the first base 102*a* about the hinge pin 109. The first base 102*a* is provided with recesses 107*a* for receiving the bearings 107 when the second base 102*b* is rotated, and the second base 102*b* is provided with recesses 106*a* for receiving the bearings 106. The aligner units 105A on the first base 102*a* are disposed adjacent the axis of the hinge pin 109. The position is so determined for the following reason. FIG. 8 is a view as seen in the direction D in FIG. 7. As will be described hereinafter, the second base 102*b* is rotated about the hinge pin 109 in the direction B to fold the sheet S, and therefore, the folding proceeds from the overlaid portion of the sheet S. Therefore, the aligner units 105A for effecting the positioning in the X direction in FIG. 7 are particularly disposed adjacent the hinge pin 109, so as to enhance the sheet folding accuracy.

Referring to FIG. 9, the aligner units 105A and 105B for positioning the sheet S will be described. FIG. 9 is an enlarged view of an aligner unit 105A as seen in the direction D in FIG. 7. In FIG. 9, aligner folder 120 are disposed at the opposite sides of the first base 102*a*. To the aligner folder 120, an L-shaped aligner 123 is rotatably mounted by a pin 121. The aligner 123 is urged in a direction indicated by an arrow A by a torsion spring around the pin 121, so that the top surface of the horizontal portion of the aligner 123 abuts a portion C of the aligner folder 120. The other aligner unit 105B has a similar structure, and therefore, the detailed description thereof is omitted for simplicity.

In FIG. 7, a reference numeral 110 designates an electrostatic attraction switch in the form of a seesaw switch for actuating the electrostatic attraction plate 103. When the second base 102*b* is closed, as shown in FIG. 8, the electrostatic attraction switch 110 is pushed by a switch pushing member 111 provided on the second base 102*b*, so that it is deactuated. In other words, when the second base 102*b* is closed, the electrostatic attraction force by the electrostatic attraction plate 103 for the sheet S disappears.

Adjacent an electrostatic attraction plate switch 110, there is a light emitting diode (LED) 110*a* which emits light when the electrostatic attraction plate switch 110 is in the on-state. On the basis of the diode 110*a*, the operator can discriminate the on-state of the electrostatic attraction plate 103. In addition, when the bases 102*a* and 102*b* are closed, the off-state of the electrostatic attraction plate 103 is visually discriminated through a hole 111*a* formed adjacent the switch pushing member 111. To a free end of the second base 102*b*, a grip 112 is formed or mounted to facilitate rotation of the second base 102*b*.

In operation, the operator places a part (approximately half) of the sheet S to be folded is placed on the first base 102*a*. At this time, the operator moves the sheet S in a direction indicated by an arrow E in FIG. 7 to abut the Y direction edge to the aligner units 105B and to abut the X direction edge to the aligner units 105A, so that the sheet S is correctly positioned on the first base 102*a*.

Then, the operator actuates the electrostatic attraction plate switch 110 to provide the electrostatic attraction force, by which the sheet S is attracted on the plate 103 of the first base 102*a* at the correct position. At this time, the light emitting diode 110*a* is turned on.

As shown in FIG. 8, the operator folds the unsupported portion of the sheet S, that is, the portion extending out of the first base 102*a* onto the supported portion of the sheet S so that the corner F' is aligned with the corner F, and abuts the edges of the sheet S to the aligner units 105A and 105B.

The folded-back portion of the sheet S is also attracted on the first base 102 by the electrostatic attraction force provided by the plate 103. In this attraction, the attraction force is large at a portion Sb where the sheet directly contacts to the electrostatic attraction plate 103, but the attraction force is weak at the folded portion Sa where the sheet does not directly contact to the electrostatic attraction plate 103. Therefore, the aligning operation to the aligner units 105A and 105B can be carried out without difficulty.

Thereafter, the operator rotates the second base 102*a* using the grip 112 so that the second base 102*a* is overlaid on the first base 102*b*, by which the sheet is correctly folded and overlaid.

Referring to FIG. 9, the operation of the aligner units 105A and 105B during the folding operation will be described. When the second base 102*b* is rotated in a direction indicated by an arrow B, the aligner 123 is pushed by the second base 102*b*, so that the aligner 123 is rotated in the opposite direction, that is, the direction indicated by an arrow A, about a pin 121, so that it is moved away from the side edge G (X direction) of the sheet S. The aligner unit 105B operates in the same way when the second base 102*b* is closed.

When the second base 102*b* is closed, the electrostatic attraction plate switch 110 is pushed by a switch pushing member 111, so that the switch is deactuated. Then, the light emitting diode 110*a* is turned off, and simultaneously, the electrostatic attraction force by the plate 103 for the sheet S disappears, thus facilitating the operator taking out the folded sheet.

Figure 10:
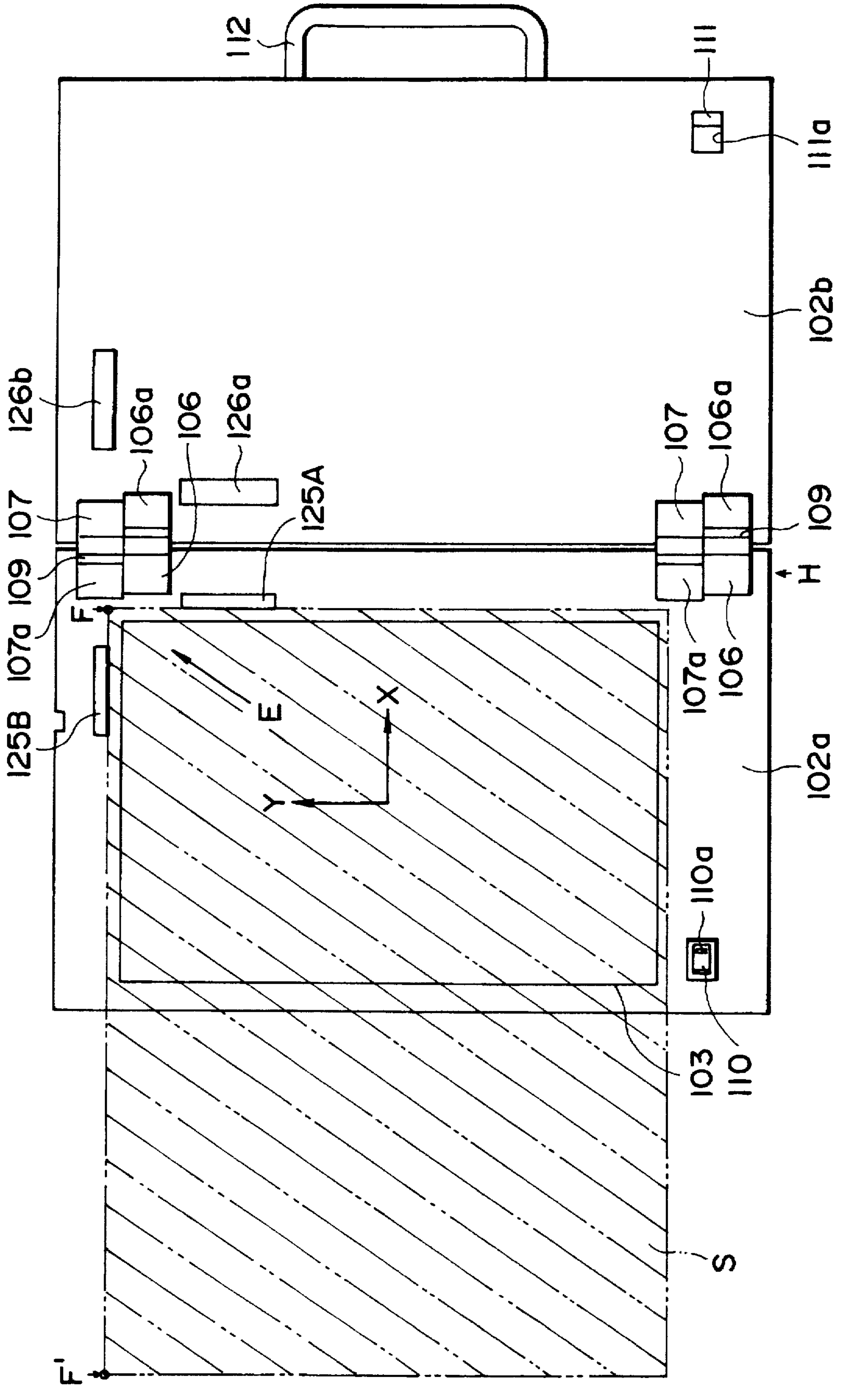
FIG. 10 is a top plan view of a sheet folder according to a further embodiment of the present invention.
Figure 11:
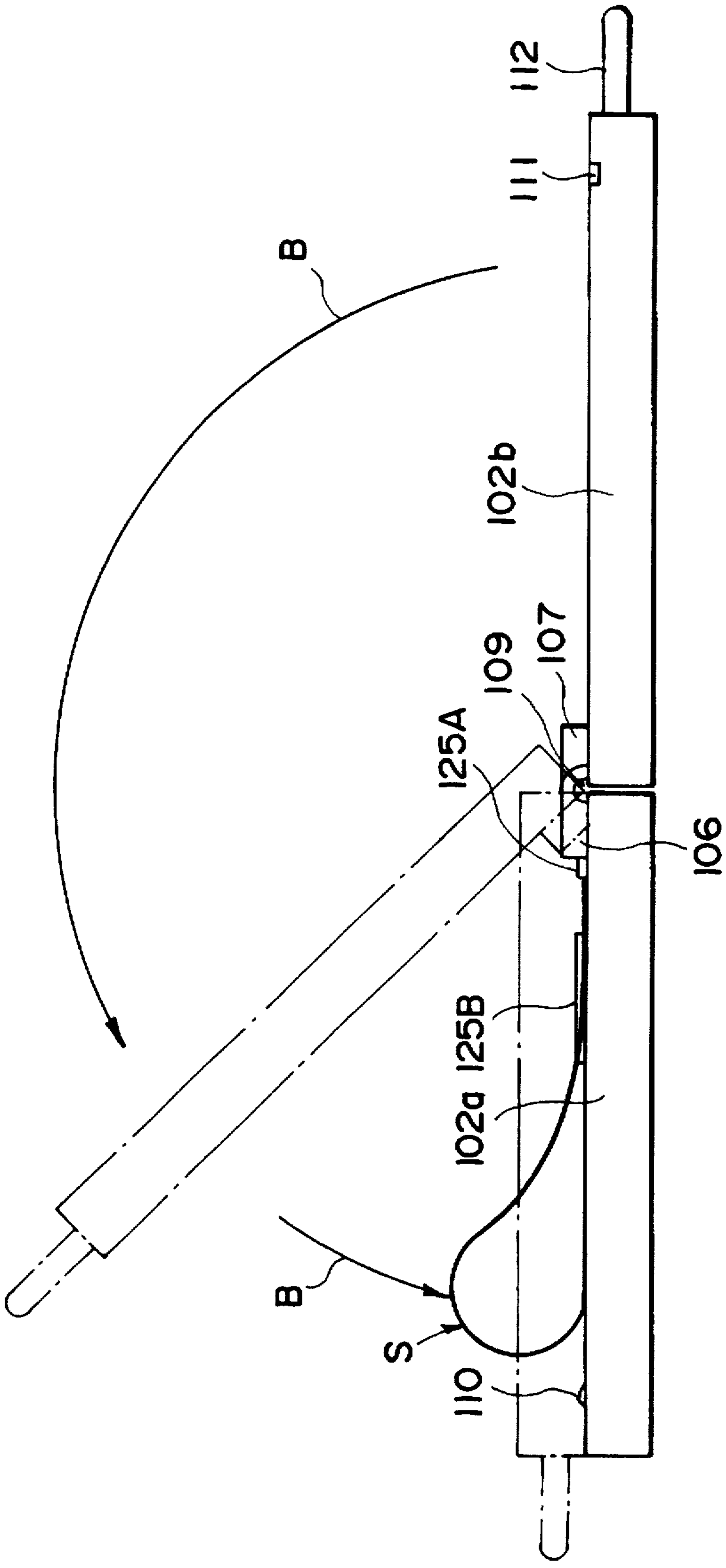
FIG. 11 is a side view illustrating opening and closing of the apparatus of FIG. 10.

Referring to FIGS. 10 and 11, a description will be provided as to a sheet folding apparatus. In FIG. 10, aligner units 125A and 125B are shown which are replaceable with the aligner units 105A and 105B of the previous embodiment. In the present embodiment, the aligner units 125A and 125B are fixed on the first base 102*a*. The second base 102*b* is provided with holes 126*a* and 126*b* so as to avoid interference between the aligner units 125A and 125B and the second base 102*b* when the second base 102*b* is rotated.

FIG. 11 is a view of the apparatus of FIG. 10 as seen in a direction H. The sheet S is correctly positioned and overlaid on the first base 102*a* by rotating the second base 102*b* in the direction B. The sheet S is pressed on the first base 102*a* by the second base 102*b*, and is folded in the same manner as in the first embodiment. Thus, the aligner units 125A and 125B are fixed, and the corresponding recesses are formed in the other base, and therefore, the number of parts of the aligning mechanism can be reduced as compared with the previous embodiment.

As described in the foregoing, according to this embodiment, the sheet is correctly positioned and attracted on the first base provided with the positioning and attraction mechanisms, and the second base is rotated to press the sheet in cooperation with the first base, so that the sheet is efficiently folded with the corresponding corners are correctly aligned. The folding operation is particularly efficient when the size of the sheet is large. In the description of this embodiment, the attraction means is in the form of the electrostatic attraction means, but it may be a vacuum type. In the sheet folding apparatus, the adhesive may be applied on the inside surface of the sheet, and then, the sheet is folded and bonded.

When the adhesive is a heat fusible adhesive, heaters may be used as in the third and fourth embodiment to bond the folded sheet.

While the invention has been described with reference to the structures disclosed herein, it is not confined to the details set forth and this application is intended to cover such modifications or changes as may come within the purposes of the improvements or the scope of the following claims.

What is claimed is:

1. A sheet sticker apparatus, comprising:

a pair of bases for supporting sheets, wherein one of said bases can be overlaid on the other;

sheet positioning means having a projection for correctly positioning the sheets on the respective bases by abutting the sheet to the projection and supporting means for supporting said projection to permit retraction of said projection when said bases are overlaid on each other;

attraction means disposed on at least one of said bases for attracting the sheet positioned by said positioning means; and aligning means for aligning said bases relative to each other when said bases are overlaid.

2. An apparatus according to claim 1, wherein said bases are hinged together by said connecting means.

3. An apparatus according to claim 1, wherein said attraction means electrostatically attracts the sheet.

4. An apparatus according to claim 1, wherein said attraction means attracts the sheet by vacuum.

5. An apparatus according to claim 3 or 4, wherein said attraction means is disabled when said bases are overlaid.

6. An apparatus according to claim 5, wherein said projection is disposed adjacent a rotational center of said base.

7. An apparatus according to claim 1, wherein said base has a groove formed at a position along a sheet edge.

8. A sheet sticker apparatus, comprising:

a pair of bases for supporting sheets, at least one of said sheets having an adhesive thereon, wherein one of said bases can be overlaid on the other;

sheet positioning means having a projection for correctly positioning the sheets on the respective bases by abutting the sheet to the projection and supporting means for rotatably supporting said projection to permit retraction of said projection when said bases are overlaid on each other;

attraction means disposed at at least one of said bases for attracting the sheet positioned by said positioning means; and aligning means for aligning said bases relative to each other when said bases are overlaid on each other.

9. An apparatus according to claim 8, wherein said bases are hinged.

10. An apparatus according to claim 8, wherein said aligning means includes plural positioning cone pins on one of said bases and recesses on the other base, which are engageable with the positioning means, wherein one of said bases is overlaid on the other while substantial parallelism is being maintained therebetween.

11. An apparatus according to claim 8, further comprising heating means, for a heat fusible adhesive, for partially heating the sheet.

12. An apparatus according to claim 8, further comprising heating means, for a heat fusible adhesive, for entirely heating the sheet.

13. An apparatus according to claim 11 or 12, wherein said heating means starts its heating action when said bases are overlaid with each other, and stops its heating action when said bases are separated from each other.

14. An apparatus according to claim 8, wherein said attraction means electrostatically attracts the sheet.

15. An apparatus according to claim 8, wherein said attraction means attracts the sheet by vacuum.

16. An apparatus according to claim 14 or 15, wherein said attraction means is disabled when said bases are overlaid.

17. An apparatus according to claim 9, wherein said projection is disposed adjacent a rotational center of said base.

18. An apparatus according to claim 9, wherein said base has a groove formed at a position along a sheet edge.

19. An apparatus according to claim 9, wherein said aligning means is disposed adjacent a rotational center of said base.

* * * * *

UNITED STATES PATENT AND TRADEMARK OFFICE
CERTIFICATE OF CORRECTION

PATENT NO. : 5,527,421 Page 1 of 2

DATED : June 18, 1996

INVENTOR(S) : Uehara et al.

It is certified that error appears in the above-indentified patent and that said Letters Patent is hereby corrected as shown below:

COLUMN 1:

Line 36, Adhesive" should read --The adhesive-- and "the" should be deleted.
Line 39, "sheets the" should read --sheets when the--.

COLUMN 2:

Line 40, "the" should be deleted.

COLUMN 4:

Line 51, "are" should read --is--.
Line 60, "advertently" should read --inadvertently--.

COLUMN 5:

Line 28, "restores" should be deleted.
Line 29, "restoring a" should read --by a restoring--.
Line 51, "advertently" should read --inadvertently--.

COLUMN 6:

Line 18, "on" should read --to--.

COLUMN 7:

Line 53, "to" should be deleted.

UNITED STATES PATENT AND TRADEMARK OFFICE

CERTIFICATE OF CORRECTION

PATENT NO. : 5,527,421

DATED : June 18, 1996

INVENTOR(S) : Uehara et al.

It is certified that error appears in the above-indentified patent and that said Letters Patent is hereby corrected as shown below:

Line 56, "to" should be deleted.

COLUMN 9:

Line 11, "claim 5," should read --claim 1,--.

COLUMN 10:

Line 27, "claim 9," should read --claim 10,--.

Signed and Sealed this

Tenth Day of December, 1996

Attest:

BRUCE LEHMAN

Attesting Officer

Commissioner of Patents and Trademarks